(12) United States Patent
Sasaki et al.

(10) Patent No.: US 10,042,176 B2
(45) Date of Patent: Aug. 7, 2018

(54) POLARIZATION CONVERSION ELEMENT, POLARIZATION-CONVERSION-ELEMENT MANUFACTURING METHOD, LIGHT-SOURCE UNIT, AND OPTICAL DEVICE

(71) Applicant: DEXERIALS CORPORATION, Shinagawa-ku (JP)

(72) Inventors: Koji Sasaki, Shinagawa-ku (JP); Masatoshi Sasaki, Shinagawa-ku (JP); Nobuyuki Koike, Shinagawa-ku (JP); Akio Takada, Shinagawa-ku (JP); Katsuhiro Shindo, Shinagawa-ku (JP); Toshiaki Sugawara, Shinagawa-ku (JP); Kouichi Miyagi, Shinagawa-ku (JP); Masahiro Oowada, Shinagawa-ku (JP)

(73) Assignee: DEXERIALS CORPORATION, Shinagawa-ku (JP)

( * ) Notice: Subject to any disclaimer, the term of this patent is extended or adjusted under 35 U.S.C. 154(b) by 244 days.

(21) Appl. No.: 14/892,935

(22) PCT Filed: Jun. 27, 2014

(86) PCT No.: PCT/JP2014/067176
§ 371 (c)(1),
(2) Date: Nov. 20, 2015

(87) PCT Pub. No.: WO2014/208724
PCT Pub. Date: Dec. 31, 2014

(65) Prior Publication Data
US 2016/0097936 A1    Apr. 7, 2016

(30) Foreign Application Priority Data

Jun. 27, 2013 (JP) ................... 2013-135061
Apr. 23, 2014 (JP) ................... 2014-089163

(51) Int. Cl.
*G02B 27/28* (2006.01)
*G02B 1/14* (2015.01)
(Continued)

(52) U.S. Cl.
CPC .......... *G02B 27/285* (2013.01); *C09J 183/04* (2013.01); *G02B 1/14* (2015.01); *G02B 5/04* (2013.01);
(Continued)

(58) Field of Classification Search
CPC .... G02B 27/28; G02B 27/283; G02B 27/285; G02B 27/286; G02B 5/30; G02B 5/3025; G02B 5/3083; G02F 1/13362
See application file for complete search history.

(56) References Cited

U.S. PATENT DOCUMENTS 5,932,354 A    8/1999  Takeda et al.
6,404,550 B1   6/2002  Yajima
(Continued)

FOREIGN PATENT DOCUMENTS

JP    10-81955    3/1998
JP    10-90520    4/1998
(Continued)

OTHER PUBLICATIONS

Office Action dated Feb. 28, 2017 in Japanese Application No. 2014-132515.
(Continued)

*Primary Examiner* — William R Alexander
*Assistant Examiner* — Ephrem Mebrahtu
(74) *Attorney, Agent, or Firm* — Oblon, McClelland, Maier & Neustadt, L.L.P.

(57) ABSTRACT

This invention provides a polarization conversion element that is highly resistant to the heat and light that result from increased brightness levels. In said polarization conversion
(Continued)

element, inorganic half-wave plates provided selectively on the output surface of a polarizing beam-splitter array have obliquely deposited layers comprising a dielectric material and the side surfaces of said obliquely deposited layers are covered by protective films.

25 Claims, 13 Drawing Sheets

(51) Int. Cl.
  *G02B 5/30* (2006.01)
  *C09J 183/04* (2006.01)
  *G02B 5/04* (2006.01)
(52) U.S. Cl.
  CPC ............ *G02B 5/30* (2013.01); *G02B 5/3025* (2013.01); *G02B 5/3083* (2013.01); *G02B 27/286* (2013.01)

(56) References Cited

U.S. PATENT DOCUMENTS

| | | |
|---|---|---|
| 2002/0080487 A1 | 6/2002 | Yajima |
| 2002/0089746 A1 | 7/2002 | Yajima |
| 2003/0067574 A1* | 4/2003 | Sasaki ................. G02B 5/3083 349/117 |
| 2005/0157233 A1 | 7/2005 | Wu et al. |
| 2006/0221445 A1 | 10/2006 | Dizio et al. |
| 2010/0245691 A1* | 9/2010 | Kawamura ............ G02B 27/28 349/9 |
| 2013/0155723 A1* | 6/2013 | Coleman ............... G02B 6/0018 362/621 |
| 2013/0177717 A1 | 7/2013 | Koike et al. |

FOREIGN PATENT DOCUMENTS

| | | |
|---|---|---|
| JP | H10-255313 | 9/1998 |
| JP | H11-14831 | 1/1999 |
| JP | 3486516 | 1/2004 |
| JP | 2005-215669 A | 8/2005 |
| JP | 2008-129190 A | 6/2008 |
| JP | 2008-216644 A | 9/2008 |
| JP | 2008-537163 A | 9/2008 |
| JP | 2012-8363 A | 1/2012 |

OTHER PUBLICATIONS

International Search Report dated Jul. 29, 2014 in PCT/JP14/67176 Filed Jun. 27, 2014.

* cited by examiner

POLARIZATION CONVERSION ELEMENT, POLARIZATION-CONVERSION-ELEMENT MANUFACTURING METHOD, LIGHT-SOURCE UNIT, AND OPTICAL DEVICE

TECHNICAL FIELD

The present invention relates to a polarization conversion element configured to convert light with a random polarization direction into light with one polarization direction, a method of manufacturing the same, and a light-source unit and optical device using the polarization conversion element.

BACKGROUND ART

In recent years, as for a liquid crystal display device, with the expansion of applications and the enhancement in functionality, high reliability and durability are expected for an individual device constituting the liquid crystal display device. For example, in a case of a transmission type liquid crystal projector which uses a light source with a large amount of light, a polarization conversion element configured to convert the natural light emitted from the light source into linearly-polarized light receives strong radiant rays. Therefore, if the durability of the polarization conversion element is low, the illumination efficiency will decrease.

The polarization conversion element usually includes a polarizing beam-splitter array formed by alternately bonding a polarizing beam splitter with a polarization separation film and a prism with a reflective film, wherein a phase difference plate is selectively provided above the output surface of the polarizing beam splitter.

Conventionally, as the phase difference plate selectively provided above the output surface of a polarizing beam splitter, a dichroic phase difference plate containing an iodine-based or dye-based polymer organic matter in a film is often used. As the general manufacturing method of the dichroic phase difference plate, there is adopted a method of performing dyeing using dichroic material such as a polyvinyl alcohol-based film and iodine, and then performing cross-linking using a cross-linker to perform uniaxial stretching. The phase difference plate including such a stretched polymer film is likely to deteriorate by heat and/or UV light, and is therefore poor in durability. Moreover, this type of phase generally shrinks easily, because it includes a stretched polymer film fabricated by stretching. Moreover, the polyvinyl alcohol-based film is very likely to deform particularly under a humidified condition because of using a hydrophilic polymer, and is therefore poor in mechanical strength as a device. In order to solve this problem, a phase difference element of an inorganic optical single crystal, such as a crystal, may be used, but it has the drawbacks that an increase in size is difficult and that the raw material cost and processing cost are also high.

CITATION LIST

Patent Literature

PTL 1: Japanese Patent Laid-Open No. 11-14831
PTL 2: Japanese Patent No. 3486516

SUMMARY OF INVENTION

Technical Problem

The present invention has been made in view of the above circumstances and an object of the present invention is to provide a polarization conversion element that is highly resistant to the heat and light that result from increased brightness levels, a polarization conversion element manufacturing method, and a light-source unit and optical device including the polarization conversion element.

Solution to Problem

In order to solve the above-described problems, a polarization conversion element according to one aspect of the present invention comprises: a polarizing beam-splitter array formed by bonding alternately a first light-transmitting member with a polarization split layer configured to transmit either one of a P wave or a S wave and reflect the other one and a second light-transmitting member with a reflective layer configured to reflect the other one of the P wave or the S wave reflected by the above polarization split layer, in which the other one of the P wave or the S wave incident from an incident surface is reflected to an output surface by the reflective layer; an inorganic half-wave plate selectively provided above the output surface of the polarizing beam-splitter array and having an obliquely deposited layer made of a dielectric material; and a protective film configured to cover side surfaces of the obliquely deposited layer of the inorganic half-wave plate.

A polarization conversion element manufacturing method according to one aspect of the present invention comprises the step of: fabricating an inorganic half-wave plate with an obliquely deposited layer comprising a dielectric material, side surfaces of the obliquely deposited layer being covered with a protective film; and selectively bonding the inorganic half-wave plate onto an output surface of a polarizing beam-splitter array that is formed by alternately bonding a first light-transmitting member with a polarization separation layer configured to transmit either one of a P wave or a S wave and reflect the other one and a second light-transmitting member with a reflective layer configured to reflect the other one of the P wave or the S wave to an output surface side.

A light-source unit according to one aspect of the present invention includes at least a light source, a lens configured to collect light from the light source, a polarization conversion element configured to convert the collected light to unidirectional linearly-polarized light, and a diffusion plate configured to improve the uniformity of the converted light, wherein in the polarization conversion element, a first light-transmitting member and a second light-transmitting member are bonded so that a polarizing beam-splitter array becomes plane symmetric with reference to a vertical plane that passes through a center of an inorganic half-wave plate.

An optical device according to one aspect of the present invention includes the above-described polarization conversion element.

Advantageous Effects of Invention

According to the present invention, heat resistance and light resistance can be improved as compared with a stretched polymer film because an inorganic half-wave plate includes an obliquely deposited layer made of a dielectric material. Moreover, because the side surfaces of the obliquely deposited layer are covered with a protective film, a variation in transmissivity and/or phase difference due to the moisture in the atmosphere entering the obliquely deposited layer can be prevented.

BRIEF DESCRIPTION OF DRAWINGS

FIG. 6A is a SEM photograph of the cross section of an inorganic phase difference plate, while FIG. 6B is an enlarged SEM photograph of FIG. 6A.

FIG. 19A is a front cross sectional view showing a light-source unit according to an embodiment of the present invention, while

DESCRIPTION OF EMBODIMENTS

Hereinafter, the present invention will be described in detail in the following order with reference to the accompanying drawings.

1-1. Polarization conversion element
1-2. Protection of side-surfaces of inorganic half-wave plate
1-3. First adhesive layer and second adhesive layer
1-4. Obliquely deposited layer having laminated structure
1-5. First specific example
1-6. Second specific example
1-7. Third specific example
1-8. Fourth specific example
2. Polarization conversion element manufacturing method
3. Light-source unit
4. Optical device Note that, it is needless to say that the present invention is not limited only to the following embodiments but various modifications are possible without departing from the scope and spirit of the present invention. The drawings are schematic only and the ratio and the like between the respective dimensions may differ from the real ones. The specific size and the like should be determined in consideration of the following description. Moreover, it is needless to say that the relationship and/or ratio between the respective dimensions differ between the drawings.

<1-1. Polarization Conversion Element>

Figure 1:
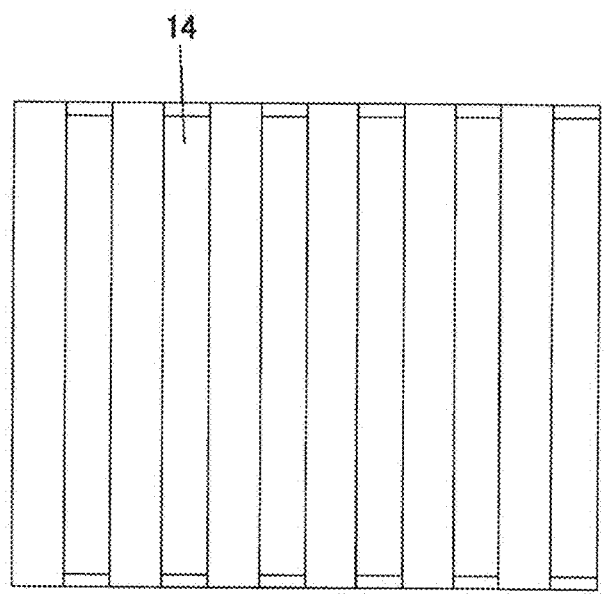
FIG. 1 is a plan view showing a polarization conversion element according to an embodiment of the present invention.
Figure 2:
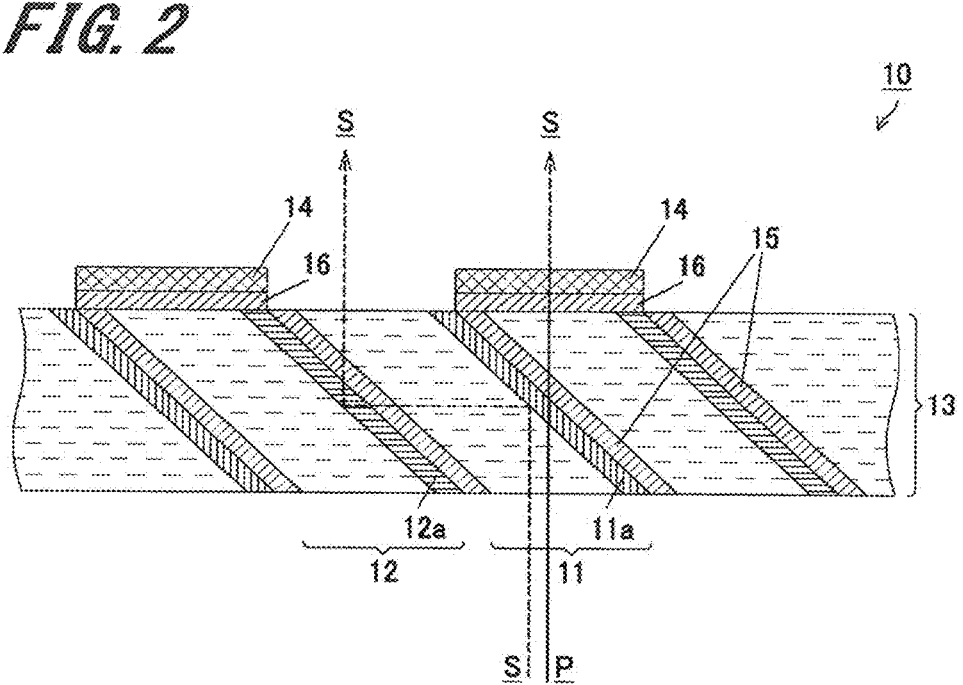
FIG. 2 is a cross sectional view showing the polarization conversion element according to the embodiment of the present invention.

FIG. 1 and FIG. 2 are the plan view and cross sectional view each showing a polarization conversion element according to an embodiment of the present invention, respectively. The polarization conversion element includes a polarizing beam-splitter array 13 formed by alternately bonding a polarizing beam splitter 11 with a polarization separation layer 11a and a reflecting prism 12 with a reflective layer 12a. An inorganic half-wave plate 14 is selectively provided above an output surface of the polarizing beam splitter 11.

The polarizing beam splitter 11 includes the polarization separation layer 11a formed on one surface of a light-transmitting member with a parallelogram cross section. The base material of the light-transmitting member includes a sapphire glass, a silica glass, a soda glass, and the like. The polarization separation layer 11a has a property to allow either one of a P wave or S wave of incident light to pass there through and reflect the other one. Such a polarization separation layer 11a is formed by laminating a dielectric film, for example.

The reflecting prism 12 includes a reflective layer 12a formed on the light-transmitting member with a parallelogram cross section. The base material of the light-transmitting member includes a sapphire glass, a silica glass, a soda glass, and the like. The reflective layer 12a has a high reflectivity against a specific linearly-polarized light component (e.g., P wave). Such a reflective layer 12a is formed, for example, by laminating a dielectric film or from a metal film of aluminum or the like.

The polarizing beam-splitter array 13 includes the polarization separation layer 11a of the polarizing beam splitter 11 and the surface on the opposite side of the reflective layer 12a of the reflecting prism 12 are bonded together, and the surface on the opposite side of the polarization separation layer 11a of the polarizing beam splitter 11 and the reflective layer 12a of the reflecting prism 12 are bonded together. Then, in the polarizing beam-splitter array 13, the polarization separation layer 11a and the reflective layer 12a each have a predetermined angle with respect to the incident surface, and are mutually arranged in parallel. The polarizing beam-splitter array 13 is formed into a substantially rectangular plate and has the inorganic half-wave plate 14 selectively bonded onto the output surface, so that all the states of polarized light output from the output surface result in a light flux of the S wave (or P wave).

The polarizing beam-splitter array 13 includes the polarizing beam splitter 11 and reflecting prism 12 that are bonded via a first adhesive layer 15 with a silicon-based adhesive. The examples of the silicone-based adhesive include the ones containing dimethyl silicone, methyl rubber, or the like which are superior in heat resistance and light resistance. The composition of the polarizing beam splitter 11 and the reflecting prism 12 being bonded via the first adhesive layer 15 made of the silicone-based adhesive improves heat resistance and light resistance.

The inorganic half-wave plate 14 is provided above the output surface of the polarizing beam splitter 11, and converts either one of the P wave or S wave into the other one. That is, the inorganic half-wave plate 14 rotates the polarization direction of a specific linearly-polarized light component transmitting through the polarization separation layer 11a by 90° to change the state thereof to the same polarization state as the P wave or S wave reflected by the polarizing beam splitter 11 and reflecting prism 12.

The inorganic half-wave plate 14 is in the shape of a substantially rectangular plate, and is provided above the light-transmitting member of the reflecting prism 12. The inorganic half-wave plate 14 is an inorganic phase difference element with a single or a plurality of obliquely deposited layer. The obliquely deposited layer made of a dielectric micro particle formed by oblique deposition. The dielectric micro particle may use a highly refractive member containing $Ta_2O_5$, $TiO_2$, $SiO_2$, $Al_2O_3$, $Nb_2O_5$, $MaF_2$, or the like. As the result, comparing with an organic phase difference element with a stretched polymer film, high durability against heat and/or UV light can be obtained. Moreover, comparing with the phase difference element of an inorganic optical single crystal, such as crystal, the inorganic half-wave plate 14 enables to increase in size easily and to reduce the material cost and processing cost.

The obliquely deposited layer usually has a highly porous structure in order to obtain high birefringence. Accordingly, moisture in the atmosphere is likely to be adsorbed in the obliquely deposited layer, and optical properties of the obliquely deposited layer such as transmissivity and phase difference likely to vary. The obliquely deposited layer has a low-density columnar structure, and contains cavities in volume ratio of 20 to 30%. The cavity portion of the obliquely deposited layer immediately after fabrication contains air (refractive index 1.0) as the principal component, but absorbs moisture in the atmosphere (refractive index 1.3) at room temperature, and the optical property of the obliquely deposited layer will vary. When exposed to the atmosphere of more than 100° C., the absorbed moisture will evaporate and the air becomes the principal component again. As described above, due to the moisture content variation in the obliquely deposited layer according to temperature causes the refractive index of the cavity portion variation. As the result, birefringence of the obliquely deposited layer and a transmissivity and/or phase difference will change.

Therefore, the side surfaces of the obliquely deposited layer are covered with a highly-dense protective film. The deposition of the protective film enables to prevent the moisture in the atmosphere from going into and coming out from the obliquely deposited layer and improve the moisture resistance.

An inorganic compound of low humidity permeability, for example such as $SiO_2$, $Ta_2O_5$, $TiO_2$, $Al_2O_3$, $Nb_2O_5$, LaO, or $MgF_2$, is preferably used as a material of the protective film.

The protective film deposition method adopts a method of capable of depositing a low moisture-permeable protective film by densely forming such an inorganic compound. As the example of such a protective film deposition method, chemical vapor deposition (CVD) method is described. In the case of depositing the protective film by CVD method, a substrate having a birefringent layer formed thereon is installed into a vessel of which the pressure being from atmospheric pressure to a medium degree of vacuum (100 to $10^{-1}$ Pa). Then a gaseous inorganic compound which is the material of the protective film is fed into this vessel, and by supplying an energy, such as heat, plasma, or light, chemically reaction between gaseous inorganic compound and the birefringent layer will occur. Such CVD method makes it possible to densely form an inorganic compound onto the birefringent layer, resulting in a low moisture-permeable protective film. Regarding the protective film deposition method, any method which makes it possible to densely form an inorganic compound, such as plasma assist deposition or sputtering can be adopted in place of such CVD method may be employed.

The reflecting prism 12 and the inorganic half-wave plate are preferably bonded via a second adhesive layer 16 comprising a silicone-based adhesive, same method as the polarizing beam-splitter array 13. As the result, heat resistance and light resistance can be improved.

An antireflective film (AR film) is preferably formed onto the output surface of the polarizing beam splitter 11 and the output surface of the inorganic half-wave plate 14. The antireflective film is, for example, a multilayer thin film including a high refractive index film and a low refractive index film, and is capable of preventing surface reflection and improving transmittivity.

In the polarization conversion element with such the a configuration, light including the S wave and P wave and having a random polarization direction is incident upon plane of incidence. The incident light is first split into the S wave and P wave by the polarization separation layer 11a. The S wave (or P wave) is reflected by the polarization separation layer 11a being substantially parallel to the incident surface of the polarizing beam-splitter array 13, and is further reflected by the reflective layer 12a and emitted substantially perpendicularly to the output surface of the polarizing beam-splitter array 13. On the other hand, the P wave (or S wave) transmits through the polarization separation layer 11a as it is, and is converted into the S wave (or P wave) by the inorganic half-wave plate 14 and emitted therefrom. Accordingly, all the light fluxes having a random polarization direction incident upon the optical element are converted into the light fluxes of the S wave (or P wave) and emitted.

Figure 3:
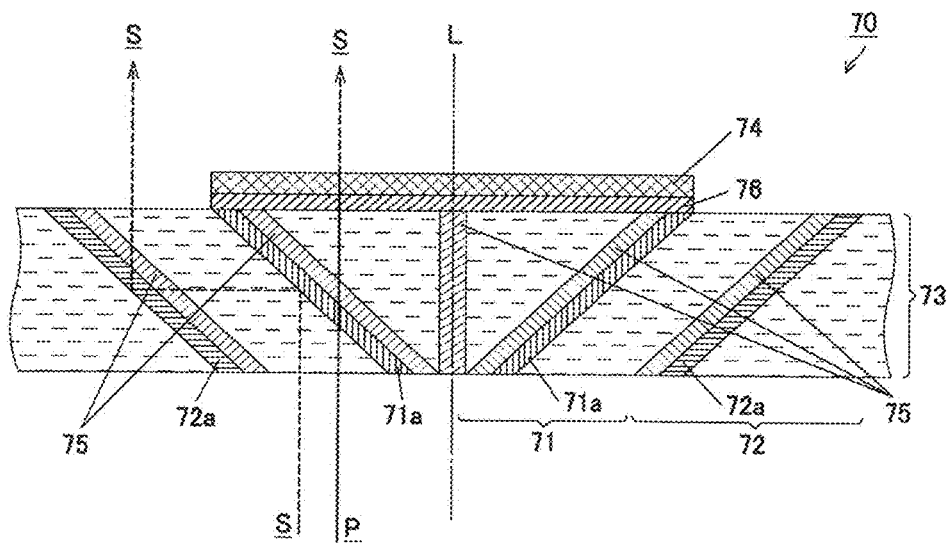
FIG. 3 is a cross sectional view showing a variation of the polarization conversion element according to the embodiment of the present invention.

FIG. 3 is a cross sectional view showing a variation of the polarization conversion element according to one embodiment of the present invention. The polarization conversion element 10 in FIG. 2 includes the polarization separation layer 11a and the reflective layer 12a are tilted in the same direction. Also for example, for a polarization conversion element 70 shown in FIG. 3, a polarizing beam-splitter array 73 may comprise a first light-transmitting member (polarization separation layer) 71a and a second light-transmitting member (reflective layer) 72a are bonded so as to be plane symmetric with reference to a vertical plane L that passes through the center of an inorganic half-wave plate 74. Such a configuration may reduce the number of inorganic half-wave plate 74 and simplify the structure.

Also in the polarization conversion element shown in FIG. 3, among the incident light, for example a P polarization component passes through the first light-transmitting member (polarization separation layer) 71a and is converted into S polarized light by the inorganic half-wave plate 74. On the other hand, an S polarization component is reflected by the first light-transmitting member (polarization separation layer) 71a and second light-transmitting member (reflective layer) 72a, and is outputted as S polarized light, as it is. As the result, all the light fluxes each having a random polarization direction and being incident upon the polarization conversion element 70 according to one embodiment of the present invention converting into a light flux of the same S wave (or P wave) output.

<1-2. Protection Of Inorganic Half-Wave Plate>

Figure 4:
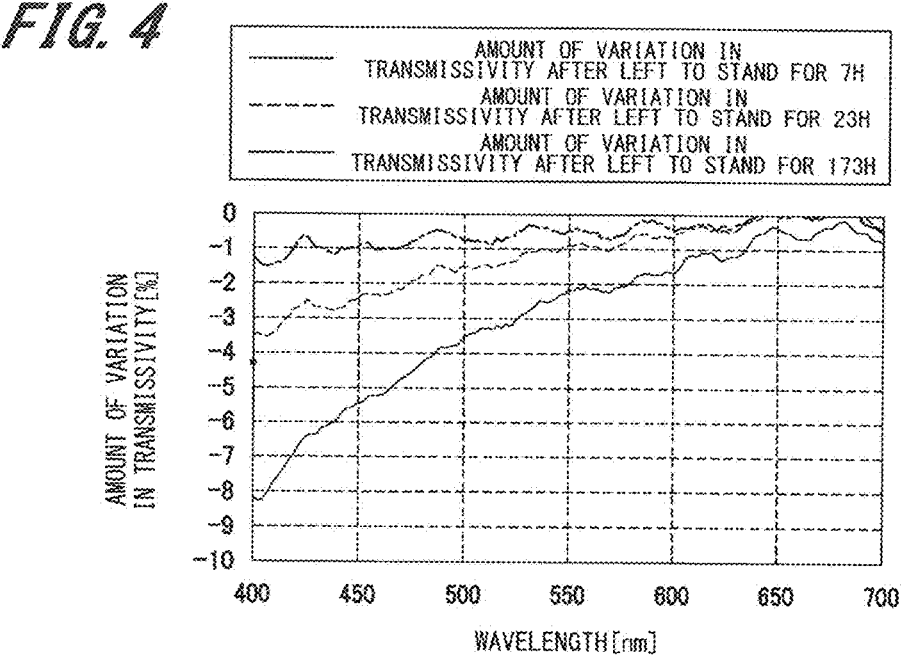
FIG. 4 is a graph showing changes in the transmissivity before and after a high-humidity/high-temperature test of an inorganic phase difference plate.

Here, the moisture resistance of the inorganic phase difference plate is verified. FIG. 4 is a graph showing changes in the transmissivity before and after a high-humidity/temperature test of an inorganic phase difference plate. The amount of variation in the transmissivity before and after the high-humidity/temperature test was calculated using a sample that was obtained by cutting the inorganic phase difference plate with the obliquely deposited layer into a desired size and exposing the obliquely deposited layer. After the high-humidity/temperature test, the amount of variation in the transmissivity was calculated by measuring the transmissivity after the sample was left to stand for 7, 23, and 173 hours, respectively, at room temperature. The conditions of the high-humidity/temperature test were set to 60° C., 90%, and 48 hours.

As seen from FIG. 4, in the inorganic phase difference plate, the transmissivity characteristic degraded by approximately −5.5% at the wavelength of 450 mm after left to stand for 7 hours, but the transmissivity characteristic recovered to approximately −2.5% after left to stand for 23 hours and the transmissivity characteristic recovered to −1.0% after left to stand for 173 hours. That is, in the inorganic phase difference plate, moisture in the atmosphere tends to be adsorbed by the highly porous portion of the obliquely deposited layer and then the moisture gradually evaporates. Accordingly, the transmissivity characteristic is considered to be able to recover in a shorter time by leaving the inorganic phase difference plate with the obliquely deposited layer to stand under the atmosphere of more than 100° C.

Figure 5:
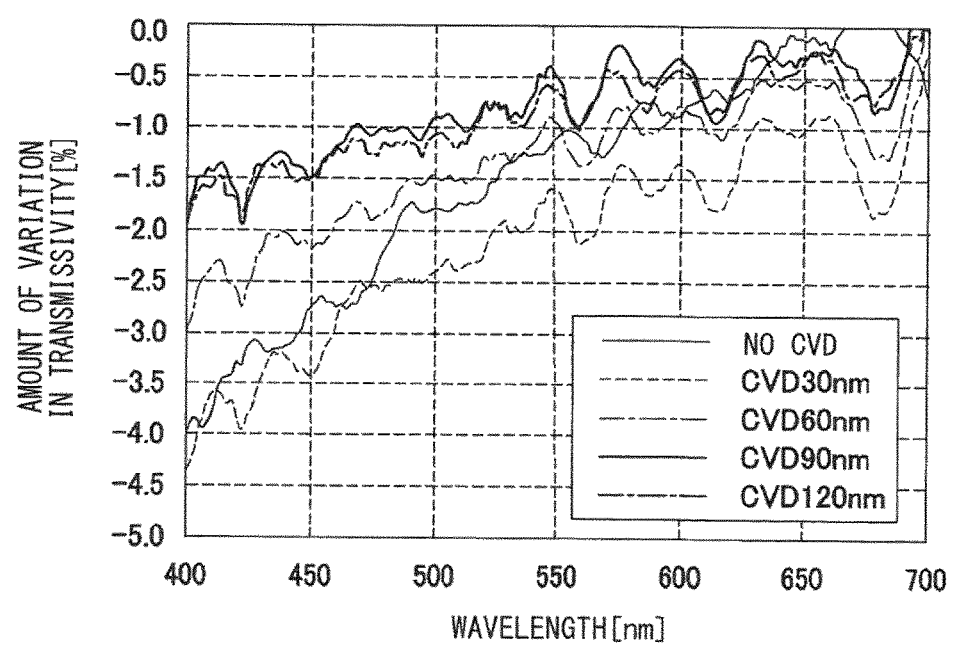
FIG. 5 is a graph showing changes in the transmissivity before and after a high-humidity/high-temperature test of an inorganic phase difference plate formed by depositing a $SiO_2$ film onto an obliquely deposited film surface.

FIG. 5 is a graph showing changes in the transmissivity of an inorganic phase difference plate formed by depositing a $SiO_2$ film onto the surface of an obliquely deposited film before and after a high-humidity/temperature test. The amount of variation in the transmissivity before and after the high-humidity/temperature test was calculated using a sample that was obtained by cutting the inorganic phase difference plate with the obliquely deposited layer into a desired size and depositing a $SiO_2$ film by CVD onto the obliquely deposited layer. The amount of variation in the transmissivity was calculated by measuring the transmissivity after the sample was left to stand for 24 hours at room temperature after the high-humidity/temperature test. The conditions of the high-humidity/temperature test were set to 60° C., 90%, and the 48 hours.

As seen from FIG. 5, the deposition of the $SiO_2$ film with the film thickness of more than 60 mm onto the obliquely deposited layer allowed the amount of variation in the transmissivity to be reduced. Moreover, by depositing the $SiO_2$ film with the film thickness of no less than 60 mm, the obliquely deposited layer in the thickness direction is covered with $SiO_2$.

Figure 6:
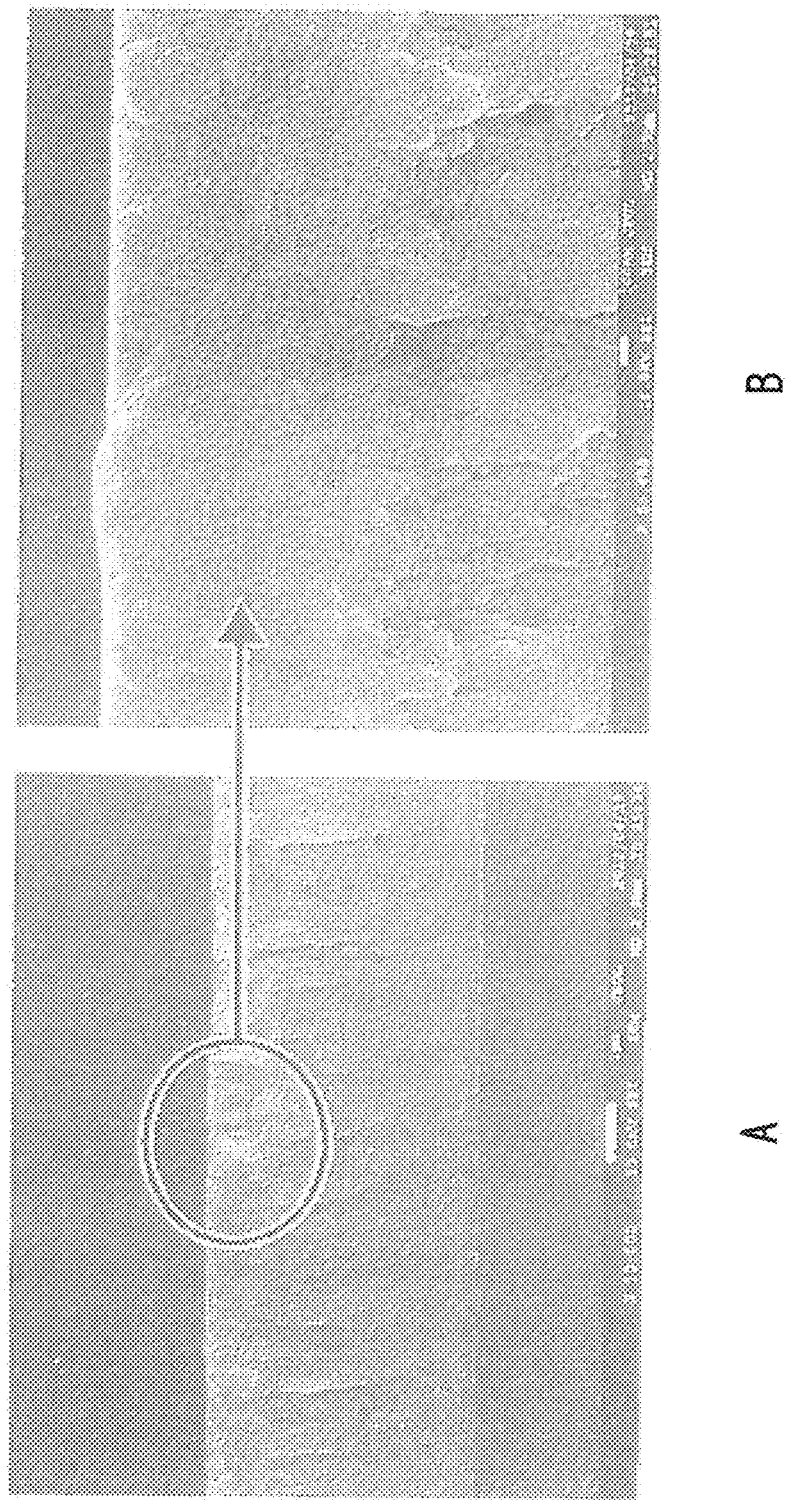

FIG. 6A is a SEM photograph of the cross section of an inorganic phase difference plate, and FIG. 6B is an enlarged SEM photograph of the SEM photograph FIG. 6A. The inorganic phase difference plate was obtained by depositing a $SiO_2$ film with the film thickness of 90 mm onto the obliquely deposited layer. As seen from FIG. 6A and FIG. 6B, it is confirmed that the side surfaces of the obliquely deposited layer are covered with the $SiO_2$ film. Accordingly, it is disclosed that by depositing the $SiO_2$ film with the film thickness of no less than 60 mm onto the obliquely deposited layer, the side surfaces of the obliquely deposited layer are covered with the $SiO_2$ film and an excellent moisture resistance characteristic can be obtained.

<1-3. First Adhesive Layer And Second Adhesive Layer>

Next, to verify the heat resistance and light resistance of the first adhesive layer 15 and second adhesive layer 16 is shown. In the conventional polarization conversion element, a UV (ultraviolet) curing adhesives is often used as the optical adhesive bonding alternately a polarizing beam splitter and a prism. Similarly, also the UV curing adhesive is often used to bond the output surface of a polarizing beam splitter and a half wave plate.

Figure 7:
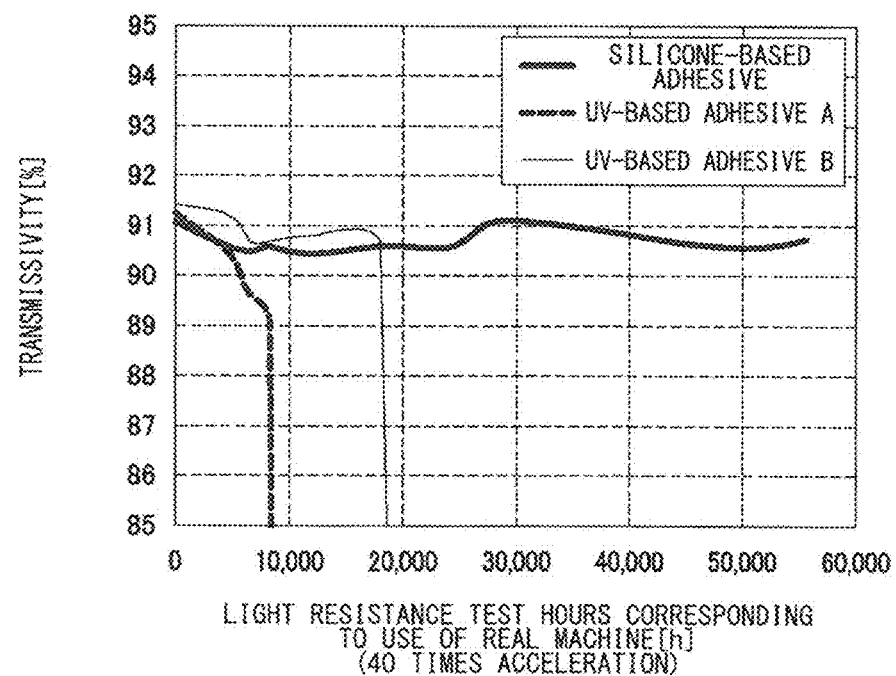
FIG. 7 is a graph showing the results of a light-resistance acceleration test of a silicone-based adhesive and UV adhesives.
Figure 8:
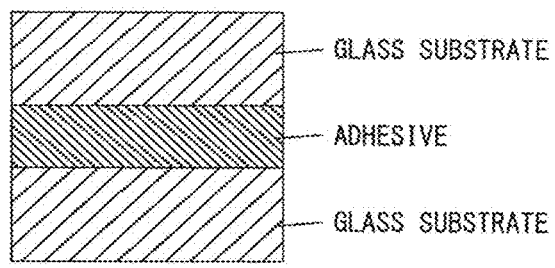
FIG. 8 is a cross sectional view showing the configuration of a sample for the light-resistance acceleration test.

FIG. 7 is a graph showing the results of a light-resistance acceleration test of a silicon-based adhesive and UV adhesives. FIG. 8 is a cross sectional view showing the configuration of a sample. The sample was prepared by bonding two glass substrates with an adhesive. As the light-resistance acceleration test conditions, the power density was set to 32 $W/cm^2$ that is 40 times the power density of a high luminance projector (real machine), and the surface temperature of a substrate of the sample was set to 70° C. That is, the light-resistance acceleration test was conducted under the acceleration that is approximately 40 times the real use of the real machine.

As in the graph shown in FIG. 7, in a sample using a UV adhesive A (XLV90 made by Kyoritsu Chemical & Co., Ltd.), the adhesive layer yellowed after approximately 5,000 hours corresponding to the use of a real machine. Moreover, destruction occurred in the sample after approximately 6,000 hours corresponding to the use of a real machine. Accordingly, when the polarization conversion element using the UV adhesive A is used for the projector, the brightness of the projector will degrade in approximately 5,000 hours, and therefore the polarization conversion element needs to be replaced with a new one every 5,000 hours.

In a sample using a UV adhesive B (UT20 made from MS-ADELL Co., Ltd), the adhesive layer yellowed and destruction occurred after approximately 18,000 hours corresponding to the use of a real machine. Accordingly, also when the polarization conversion element using the UV adhesive B is used for the projector, the polarization conversion element similarly needs to be replaced with a new one every 18,000 hours.

On the other hand, in a sample using a silicon-based adhesive C (dimethyl silicone), a decrease in transmissivity was not observed even after 50,000 hours corresponding to the use of a real machine. Accordingly, the use of the silicone-based adhesive improves the heat resistance and light resistance, and allows the polarization conversion element to continue using the silicone-based adhesive approximately 10 times or more longer as compared with the polarization conversion element using the conventional UV adhesive A.

As described above, the moisture content in the obliquely deposited film varies with the time during which the sample is left to stand and/or with the temperature at which the sample is left to stand. Then, the refractive index of a cavity portion varies and as the result the birefringence of the obliquely deposited film varies, which causes a variation in the transmissivity and/or phase difference. As the countermeasure of this, the present invention adopts the method of cutting the inorganic phase difference plate using an obliquely deposited film into a desired size, and then covering the thickness direction of the side surfaces of the obliquely deposited film with a SiO$_2$ protective film by CVD method. So the moisture in the atmosphere is difficult to enter the deposition film. A highly-durable polarization conversion element includes: an inorganic phase difference plate with one or more layers of highly-refractive micro particles that are formed by the oblique deposition method of the present invention; a light-transmitting member with a polarization split layer that allows to transmit the P wave among the light incident upon the light-transmitting member therethrough and reflects the S wave; and a light-transmitting member with a reflective layer for further reflecting this reflected S wave, wherein the inorganic phase difference plate, the light-transmitting member, and the light-transmitting member are bonded with a silicone-based adhesive. The highly-durable polarization conversion element is excellent in light resistance and heat resistance. Therefore even in a case of the moisture in the atmosphere entering the deposition film, the moisture is evaporated in a shorter time from a highly porous portion of the obliquely deposited film by exposing to the atmosphere no less than 100° C. and the transmissivity characteristic can be recovered.

<1-4. Obliquely Deposited Layer Comprising Stacked Structure>

Next, the obliquely deposited layer in the inorganic half-wave plate is described. The obliquely deposited layer in the embodiment preferably has a laminated structure. In a plurality of obliquely deposited layer, any phase difference can be theoretically set by adjusting the film thickness. For the reason that each interlayer reflectivity is proportional to the film thickness of each layer, the film thickness of each layer is preferably equal to or less than a used wavelength.

The dielectric material of the obliquely deposited layer is preferably an oxide of either one of Ta, Zr, Ti, Si, Al, Nb, and La or a combination thereof. Specific examples of the dielectric material include a material obtained by adding 5 to 15 wt % of TiO$_2$ into Ta$_2$O$_5$, ZrO$_2$, TiO$_2$, or Ta$_2$O$_5$. The use of such dielectric material enables to obtain an obliquely deposited layer, in which each of the refractive indexes $n_{oblx}$, $n_{obly}$ ($n_{oblx} > n_{obly}$) in two axes x, y orthogonal to each other within a plane becomes equal to or greater than 1.55 and equal to or less than 1.7.

Figure 9:
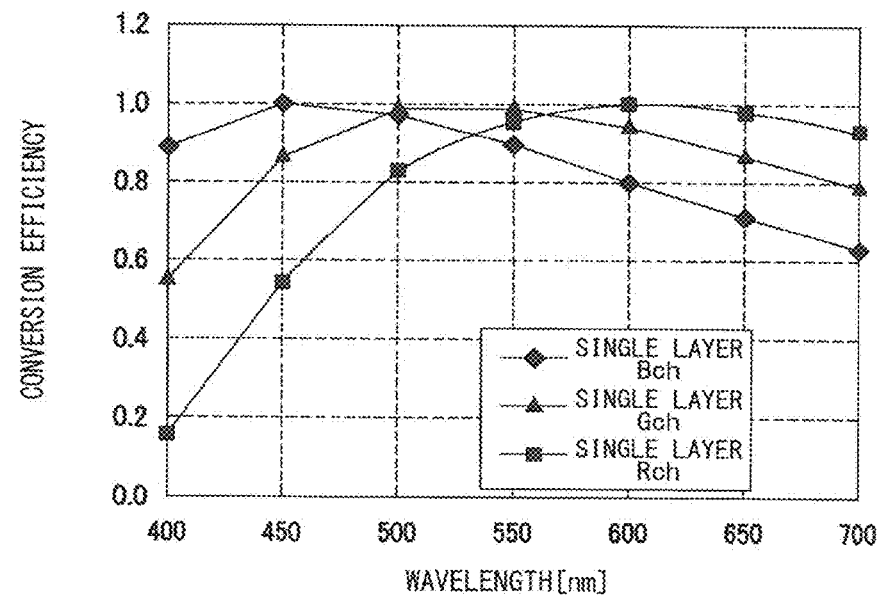
FIG. 9 shows the simulation results of a P to S conversion efficiency when the obliquely deposited layer is a single layer.

FIG. 9 shows the simulation results of a P to S conversion efficiency when the obliquely deposited layer in an inorganic half-wave plate is a single layer. In the obliquely deposited layer, a micro particle made of Ta$_2$O$_5$ was arranged while being tilted by 45 degrees with respect to the incident light (direction normal to the substrate), and the film thickness was set so as to be optimum in each of a red wavelength band, a green wavelength bandwidth, and a blue wavelength band, respectively. As seen from FIG. 9, when the obliquely deposited layer is a single layer, a high P to S conversion efficiency in a wider wavelength band cannot be obtained.

Figure 10:
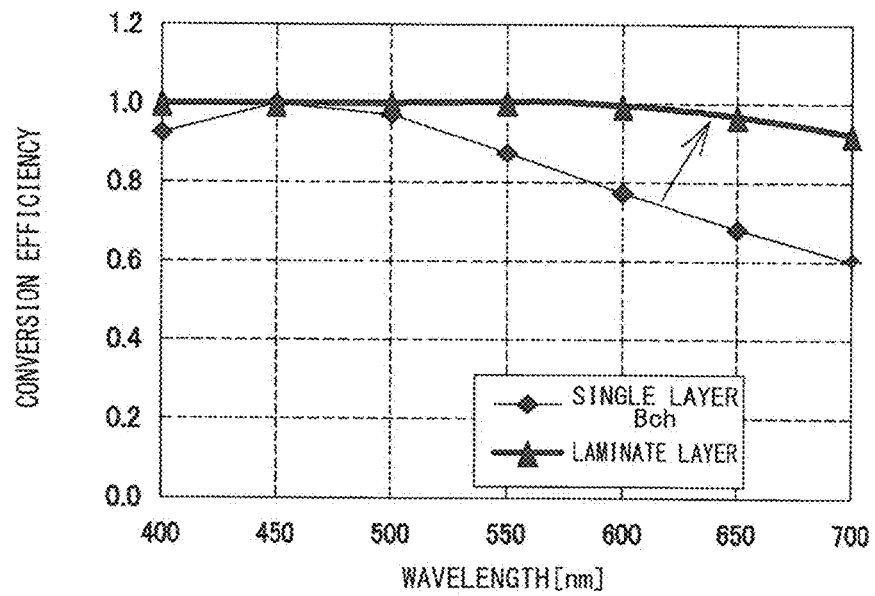
FIG. 10 shows the simulation results of the P to S conversion efficiency when the obliquely deposited layer includes a plurality of layers.

FIG. 10 shows the simulation results of a P to S conversion efficiency when the obliquely deposited layer in an inorganic half-wave plate comprises a plurality of layer. The obliquely deposited layer includes; in the first layer, a micro particle made of Ta$_2$O$_5$ is arranged while being tilted to the incident light (direction normal to the substrate) by 24 degree, while in the second layer, a micro particle made of Ta$_2$O$_5$ is arranged while being tilted to the incident light (direction normal to the substrate) by 66 degrees. As seen from FIG. 10, when the obliquely deposited layer comprises a plurality of layers (is a stacked layer), a high P to S conversion efficiency in a wider wavelength band can be obtained.

<1-5. First Specific Example>

Figure 11:
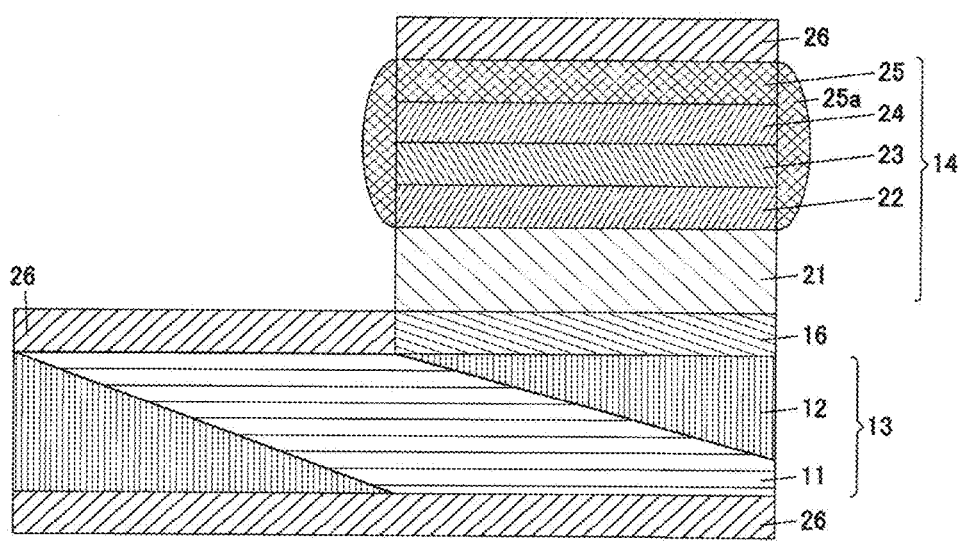
FIG. 11 is a cross sectional view showing the configuration of a first specific example of the polarization conversion element.

FIG. 11 is a cross sectional view showing the configuration of a first specific example of the polarization conversion element. In a polarization conversion element shown as the first specific example, a light-transmitting member of the polarizing beam splitter 11, a light-transmitting member of the reflecting prism 12, and a substrate of the inorganic half-wavelength plate 14 each includes a glass substrate whose refractive index n is 1.46.

The inorganic half-wave plate 14 comprises a glass substrate 21, a first refractive-index adjustment layer 22, an obliquely deposited layer 23, a second refractive-index adjustment layer 24, and an SiO$_2$ film 25 that are laminated in this order. Moreover, the inorganic half-wave plate 14 is bonded to the beam splitter array 13 via the second adhesive layer 16 containing a silicone-based adhesive (n=1.41), with the glass substrate 21 side used as the bonding surface.

In the polarization conversion element shown as the first specific example, because the SiO$_2$ film 25 is formed on the refractive-index adjustment layer 24, a final-AR film 26 for suppressing the reflection at an interface with the atmospheric air can be deposited using the same design method. Moreover, because the side surfaces of the obliquely deposited layer 23 having a highly porous structure are covered with the SiO$_2$ film 25a, the infiltration of moisture into the obliquely deposited layer 23 can be prevented and moisture resistance can be improved.

Figure 12:
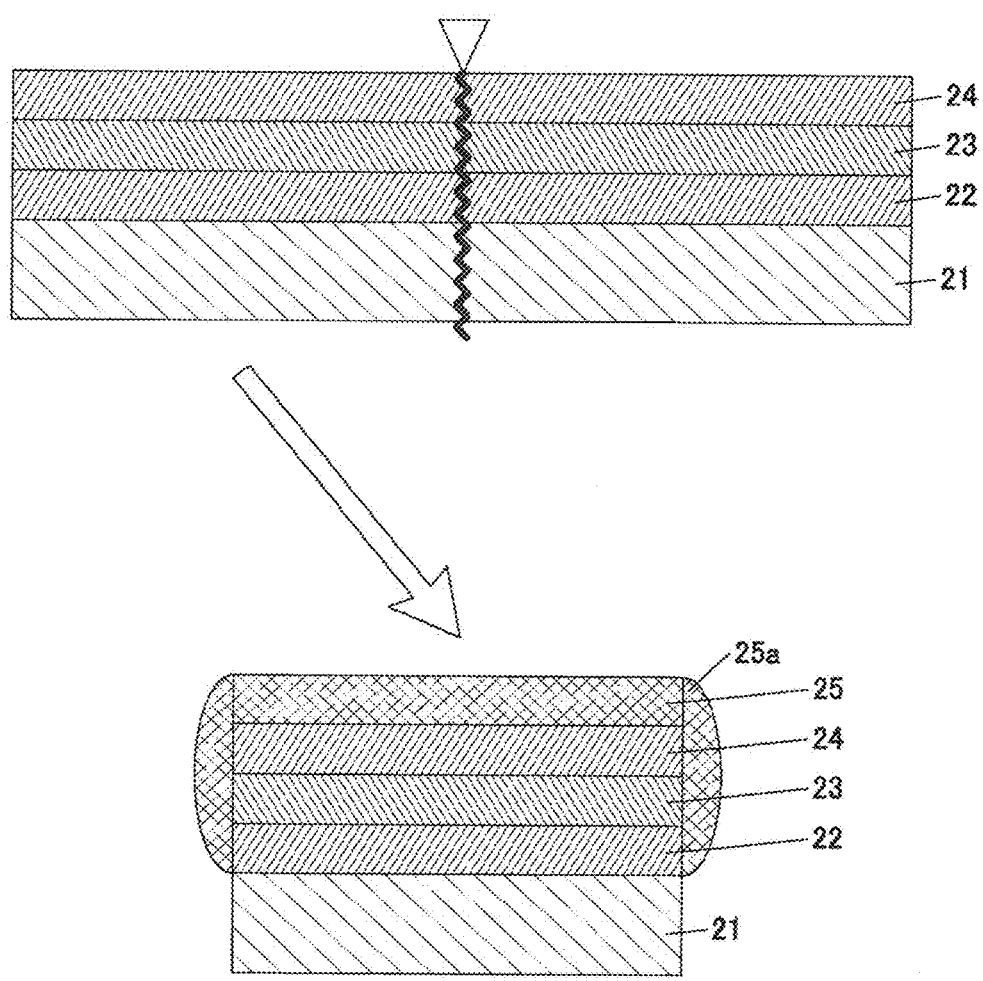
FIG. 12 shows a method for fabricating an inorganic half-wave plate of the first specific example.

FIG. 12 illustrates a fabricating method of the inorganic half-wave plate of the first specific example. The first refractive-index adjustment layer 22, the obliquely deposited layer 23, and the second refractive-index adjustment layer 24 are formed onto the glass substrate 21, and then the resulting glass substrate 21 is cut with a scriber or the like, and an SiO$_2$ film is formed, for example, by CVD method, so that the film thickness thereof becomes equal to or greater than 60 nm. As the result, the thickness direction of the obliquely deposited layer 23 can be covered with the SiO$_2$ film 25a and the moisture resistance can be improved.

In the polarization conversion element shown in FIG. 11, the inorganic half-wave plate 14 may be bonded with the SiO$_2$ film 25 side used as the bonding surface. Also in this case, moisture resistance may be improved like the first specific example. Moreover, for example, in case of applying to a cinema projector that is used in a movie theater or the like, the surface of the polarization conversion element is periodically wiped and cleaned because oil mist called popcorn oil adheres to the surface. However, by bonding the deposition surface side with a silicone adhesive, the deposition surface can be prevented from being directly wiped.

<1-6. Second Specific Example>

Figure 13:
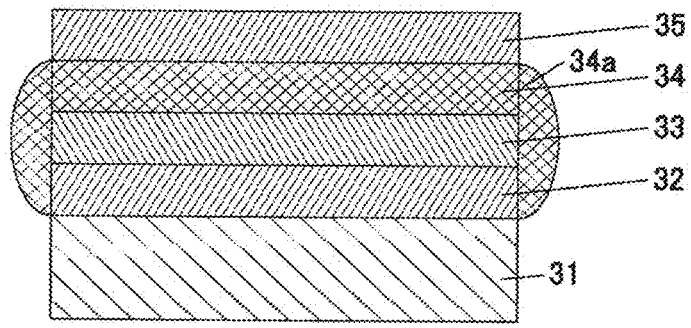
FIG. 13 is a cross sectional view showing the configuration of an inorganic half-wave plate of a second specific example.

FIG. 13 is a cross sectional view showing the configuration of an inorganic half-wave plate of a second specific example. The beam splitter array 13 of the polarization conversion element is the same as the first specific example. As shown in FIG. 13, the inorganic half-wave plate 14 is formed by laminating a glass substrate 31, a first refractive-index adjustment layer 32, an obliquely deposited layer 33, an SiO$_2$ film 34, and a second refractive-index adjustment layer 35 in this order.

In the inorganic phase difference plate, the SiO$_2$ film is provided as a part of the second refractive-index adjustment layer 35. The inorganic phase difference plate can be obtained by forming the obliquely deposited layer 33 and then cutting the resulting glass substrate 31 with a scriber or the like and depositing the SiO₂ film 34, for example, by CVD method. As the result, the thickness direction of the obliquely deposited layer 33 can be covered with a SiO₂ film 34*a* and the moisture resistance can be improved.

<1-7. Third Specific Example>

Figure 14:
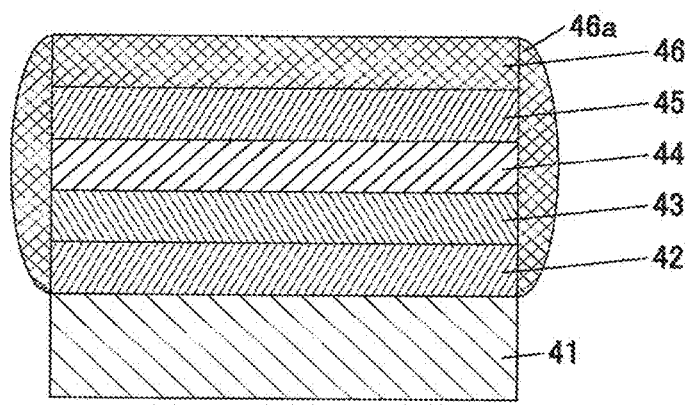
FIG. 14 is a cross sectional view showing the configuration of an inorganic half-wave plate of a third specific example.

FIG. 14 is a cross sectional view showing the configuration of an inorganic half-wave plate of a third specific example. The beam splitter array 13 of the polarization conversion element is the same as the first specific example. As shown in FIG. 14, the inorganic half-wave plate 14 formed by laminating a glass substrate 41, a first refractive-index adjustment layer 42, an obliquely deposited layer 43, a first SiO₂ film 44, a second refractive-index adjustment layer 45, and a second SiO₂ film 46 in this order.

In the inorganic phase difference plate, the SiO₂ film is provided as a part of the second refractive-index adjustment layer 45, and furthermore the SiO₂ film 46 is provided on the second refractive-index adjustment layer 45 for the purpose of protection. The inorganic phase difference plate can be obtained by depositing the second refractive-index adjustment layer 45 and then cutting the resulting glass substrate 41 with a scriber or the like and depositing the SiO₂ film 46, for example, by CVD method. As the result, the thickness direction of the obliquely deposited layer 43 can be covered with the SiO₂ film 46*a* and the moisture resistance can be improved.

<1-8. Fourth Specific Example>

Figure 15:
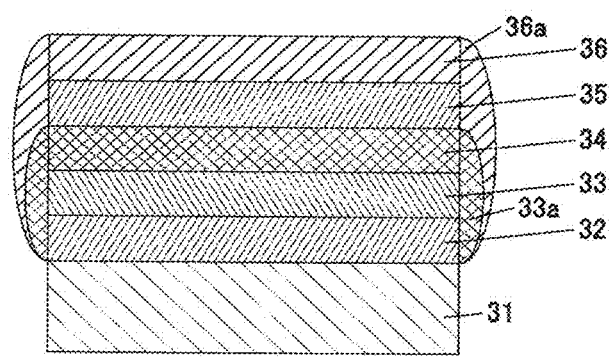
FIG. 15 is a cross sectional view showing the configuration of an inorganic half-wave plate of a fourth specific example.

FIG. 15 is a cross sectional view showing the configuration of an inorganic half-wave plate of a fourth specific example. The beam splitter array 13 of the polarization conversion element is the same as the first specific example. The inorganic phase difference plate further includes a second SiO₂ film 36 in the configuration of the inorganic half-wave plate of the second specific example shown in FIG. 13. That is, as shown in FIG. 15, the inorganic half-wave plate 14 comprises the glass substrate 31, the first refractive-index adjustment layer 32, the obliquely deposited layer 33, the first SiO₂ film 34, the second refractive-index adjustment layer 35, and the second SiO₂ film 36 that are laminated in this order.

The inorganic phase difference plate can be obtained by forming the obliquely deposited layer 33, and then cutting the resulting glass substrate 31 with a scriber or the like and depositing the SiO₂ film 34, for example, by CVD method and forming the second refractive-index adjustment layer 35, and then forming the SiO₂ film 36. As the result, the thickness direction of the obliquely deposited layer 33 can be covered with the SiO₂ film 34*a* and SiO₂ film 36*a*, and the moisture resistance can further improved.

<2. Polarization Conversion Element Manufacturing Method>

Next, a polarization conversion element manufacturing method according to the embodiment is described. The polarization conversion element manufacturing method according to the embodiment comprising a step of: alternately bonding a polarizing plate having a polarization separation layer deposited thereon and a reflective plate having a reflective layer formed thereon via a silicone-based adhesive; cutting at a predetermined angle with respect to a normal line of the surface thereof and obtaining a polarizing beam-splitter array; fabricating an inorganic half-wave plate with an obliquely deposited layer made of a dielectric material, the side surfaces of the obliquely deposited layer being covered with a protective film; selectively bonding the inorganic half-wave plate to the polarizing beam-splitter array; and depositing an antireflection coating onto an uppermost surface.

Figure 16:
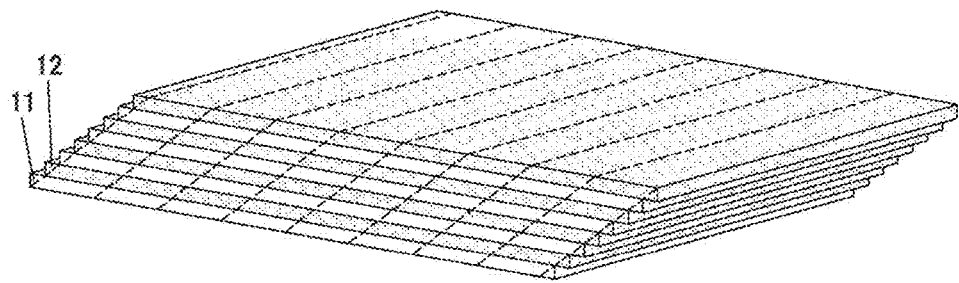
FIG. 16 is a schematic view for illustrating a step of alternately bonding a polarizing plate and a reflective plate.

First, as shown in FIG. 16, the polarizing plate and the reflective plate are alternately bonded being shifted from each other by a predetermined width in one direction. A silicon-based adhesive made of dimethyl silicone, methyl rubber, or the like is used.

Figure 17:
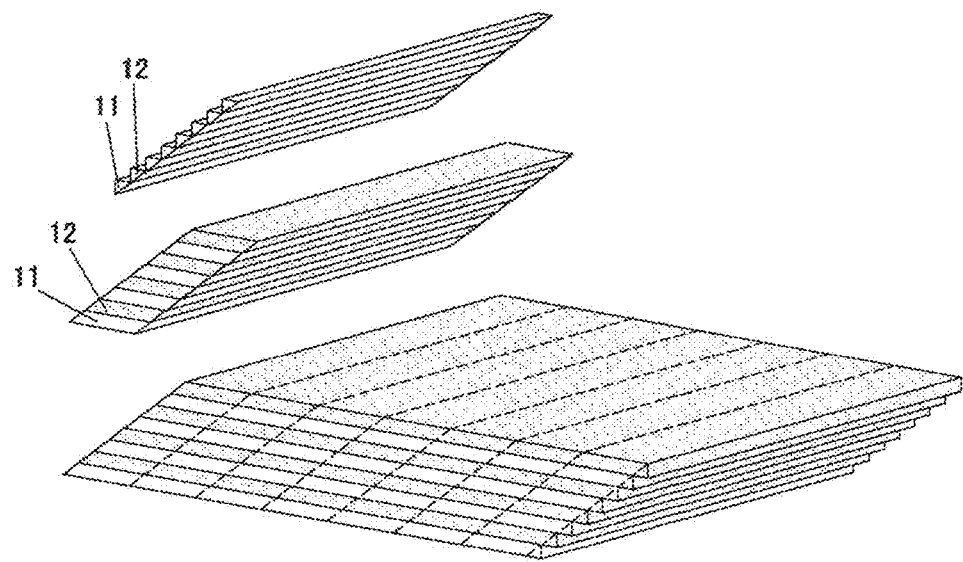
FIG. 17 is a schematic view for illustrating a step of cutting a laminated plate of a polarizing plate and a reflective plate.

In the next step, as shown in FIG. 17, by cutting in a same direction as the polarizing plate and reflective plate which is laminated by shifting from each other by a predetermined width. As the result, a polarizing beam-splitter array in which the polarizing beam splitter and reflecting prism are alternately bonded in a parallelogramic cross section can be provided. In cutting, a cutting device, such as a glass scriber, can be used.

In the step of fabricating the inorganic half-wave plate, an obliquely deposited layer containing a dielectric material is formed onto the obtained polarizing beam-splitter array, and then the resulting polarizing beam-splitter array is cut into a predetermined size using a cutting device, such as a glass scriber, and an SiO₂ film is formed, for example, by CVD method, so that the film thickness thereof become equal to or greater than 60 nm. As the result, the thickness direction of the obliquely deposited layer can be covered with the SiO₂ film and the moisture resistance can be improved.

Figure 18:
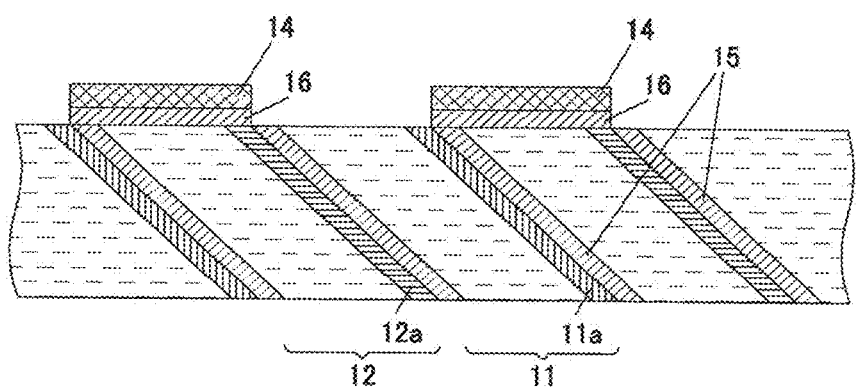
FIG. 18 is a schematic view for illustrating a step of selectively bonding an inorganic half-wave plate onto a polarizing beam-splitter array.

Next, as shown in FIG. 18, the inorganic half-wave plate 14 is selectively bonded onto the polarizing beam-splitter array. The inorganic half-wave plate 14 is preferably bonded with a silicon-based adhesive containing dimethyl silicone, methyl rubber, or the like. The inorganic half-wave plate 14 is preferably bonded so that the silicon-based adhesive protrudes from the bonding surface and extends across the side surfaces. This enables to prevent moisture from entering the obliquely deposited layer of the inorganic half-wave plate 14. The bond strength between the inorganic half-wave plate 14 and the polarizing beam-splitter array can be maintained.

For the purpose of improving the transmissivity, an anti-reflective film (AR film) is preferably formed both onto the front and back surfaces by sputtering. The AR film may be a multilayer thin film comprising a high refraction film and a low refraction film that are usually used.

By selectively bonding the inorganic half-wave plate comprising the obliquely deposited layer, whose side surfaces are covered with a protective film, onto the polarizing beam-splitter array in this manner, a polarization conversion element having an excellent moisture resistance can be obtained.

<3. Light-Source Unit>

Figure 19B:
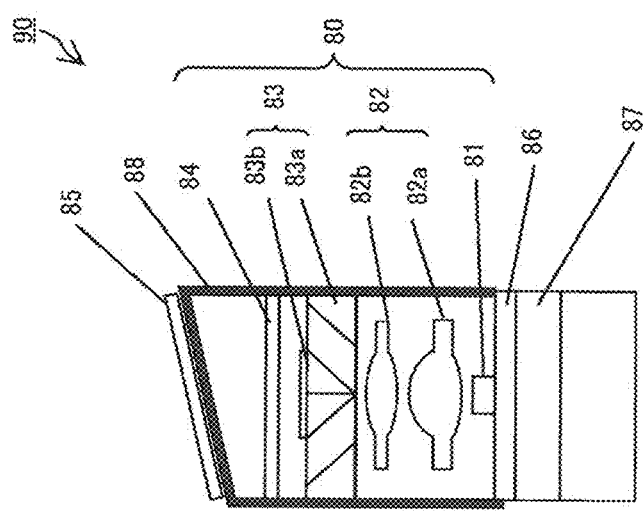
FIG. 19B is a side cross sectional view showing the light-source unit according to the embodiment of the present invention.
Figure 19A:
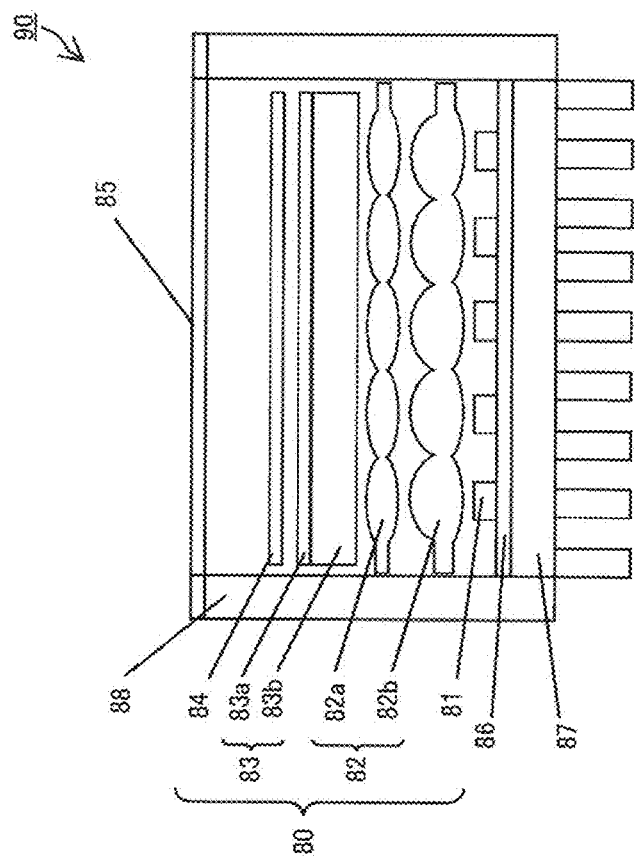

Next, a light-source unit 80 using a polarization conversion element according to one embodiment of the present invention is described. FIG. 19A is a front cross sectional view showing the light-source unit 80 according to the embodiment of the present invention, while FIG. 19B is a cross sectional side view showing the light-source unit 80 according to the embodiment of the present invention. The light-source unit 80 includes at least a light source 81, a lens 82 configured to collect light from the light source 81, a polarization conversion element 83 according to the embodiment of the present invention configured to convert the collected light into unidirectional linearly-polarized light, and a diffusion plate 84 configured to improve the uniformity of the converted light.

The light source 81 is, for example, an LED and a plurality of LEDs can be two-dimensionally arranged. The lens may be a condenser lens group 82 comprising two types of condenser lenses 82*a*, 82*b*, for example as shown in FIG. 19A and FIG. 19B, in which the condenser lenses 82*a*, 82*b* each may possess the number of lenses corresponding to the number of light sources 81. The light emitted from the light source 81, such as an LED, is incident upon the polarization conversion element 83 by the condenser lens group 82.

The polarization conversion element 83 according to one embodiment of the present invention includes a polarizing beam-splitter array 83*a* and an inorganic half-wave plate 83*b*. In particular, the polarization conversion element 70 is preferably used, in which the first light-transmitting member 71*a* and second light-transmitting member 72*a* are bonded so that the polarizing beam-splitter array 73,as shown in FIG. 3, becomes plane symmetric with reference to the vertical plane L that passes through the center of the inorganic half-wave plate 74. Use of such a polarization conversion element 83 enables to reduce the number of inorganic half-wave plates 83*b,* to simplify the structure, and make compact the light-source unit 80.

The light transmitting through the polarization conversion element 83 is diffused by the diffusion plate 84, so that the light is used to improve the uniformity of light. As the diffusion plate 84, a PVC plate used for models with a structure such as a micro lens (Semi-clear EB-04, Koeido Corporation) can be used, for example, and a micro lens array comprising an inorganic material, such as a glass material, can be used when light resistance is required.

Moreover, as shown in FIG. 19A and FIG. 19B., the light-source unit 80 using the polarization conversion element according to one embodiment of the present invention is applicable to a single-plate transmission type liquid crystal projector 90 or the like by including a liquid crystal panel 85, a heat sink 86, a heat radiator 87, and a housing 88.

By arranging the liquid crystal panel 85 in a direction that allows the light in the same direction as the polarization direction of the light emitted from the diffusion plate 84 to transmit therethrough, the light transmitting through the diffusion plate 84 can efficiently transmit through the liquid crystal panel. As the result, the light emitted from the liquid crystal panel 85 can be efficiently and uniformly projected onto a projection plane.

As described above, by providing the polarization conversion element according to one embodiment of the present invention configured to convert the polarization of light emitted from a light source, such as an LED, into unidirectional linearly-polarized light, the light emitted from a light source, such as an LED, enable to improve the brightness of the light projected onto a projection plane by efficiently transmitting through a liquid crystal panel. Moreover, fuel consumption enable to be improved by reducing the power consumption, the parts can be extended their service life by reducing the heat load on a component.

<4. Optical Device>

Figure 20:
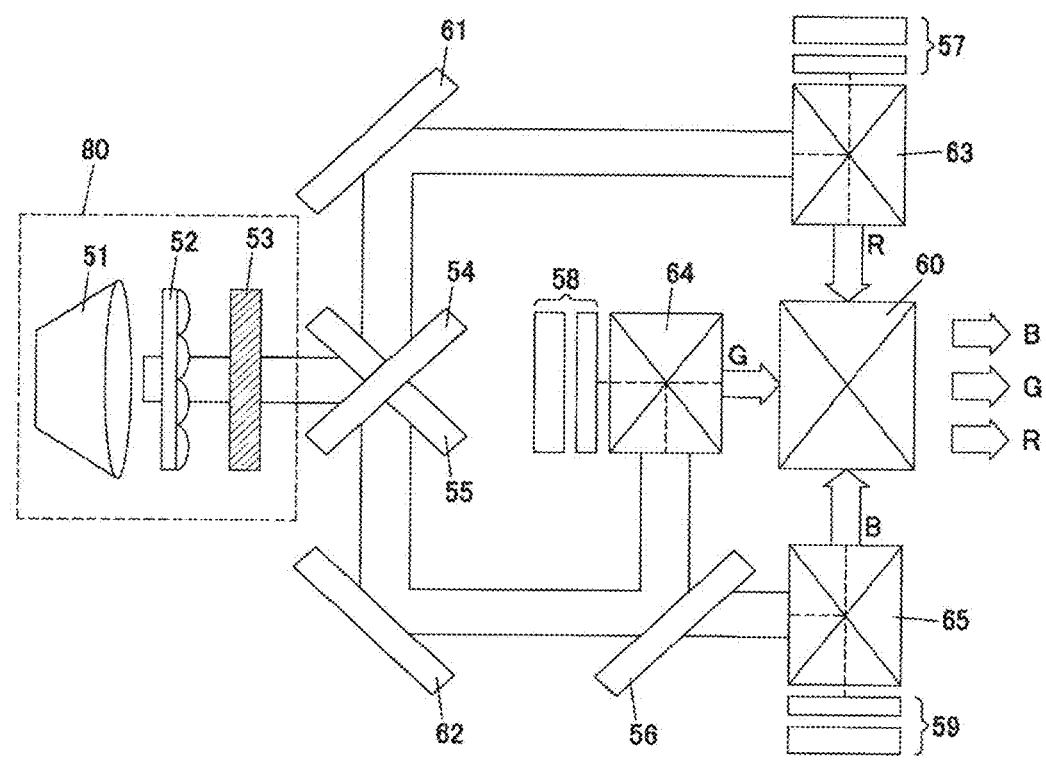
FIG. 20 shows an optical system of a liquid crystal projector.

Next, an example applied to an optical device is described with reference to a liquid crystal projector. FIG. 20 shows an optical system of the liquid crystal projector. The projector includes: a light source 51; a fly eye lens 52 configured to make a light flux substantially parallel; a polarization conversion element 53 configured to align incident randomly-polarized light to a predetermined polarization direction; color separation mirrors (dichroic mirrors) 54, 55, and 56 configured to split light into red light, green light, and blue light; a reflection-type display panels 57, 58, and 59 named LCOS (Liquid Crystal on Silicon) to display red, green, and blue colors, in which a liquid crystal is formed above a silicon substrate; a color combining prism 60 configured to form a color image by combining three colored lights; mirrors 61, 62; and PBSs (polarizing beam splitters) 63, 64, and 65.

A light flux emitted from a white lamp, for example, as the light source 51 is made substantially parallel by the fly eye lens 52, and randomly-polarized light is aligned to a predetermined polarization direction (P wave or S wave) by the polarization conversion element 53. The light flux aligned to a predetermined polarization direction is split into red light and green and blue light by the color separation mirrors 54 and 55. The green and blue light is reflected by the mirror 62, and is split into green light and blue light by the color separation mirror 56. The red light is reflected by the mirror 61 and is incident upon the PBS 63, while the green light and blue light are incident upon the PBSs 64 and 65, respectively.

In the PBSs 63, 64, and 65, only linearly-polarized light in one oscillation direction is reflected, and the reflection light is incident upon the reflection-type display panels 57, 58, and 59 for displaying red, green, and blue colors, respectively. The image light emitted from each of the reflection-type display panels 57, 58, and 59 is incident upon the PBSs 63, and 64 and 65, respectively, again, and is polarized.

The linearly-polarized light passing through PBSs 63, 64, and 65 are combined by the color combining prism 60, and a color image is projected onto a screen by a projection lens. Note that the above-described light-source unit 80 maybe applicable to optical devices.

In such an optical device, the polarization conversion element 53 of the above-described configuration enable to improve heat resistance and light resistance and to prevent a degradation, such as scorching, caused by the heat and/or light resulting from the increased brightness level. Moreover, because oil mist called popcorn oil adheres to the surface of the polarization conversion element 53, the surface is periodically wiped and cleaned and thus a strong pressure is applied to the polarization conversion element 53. However, because the adhesive layer of a silicone adhesive acts as a cushion, an excellent shock resistance can be obtained.

REFERENCE SIGNS LIST

10, 70 polarization conversion element
11, 71 polarizing beam splitter
12, 72 reflecting prism
13, 73 polarizing beam-splitter array
14, 74 inorganic half-wave plate
15, 75 first adhesive layer
16, 76 second adhesive layer
51 light source
52 fly eye lens
53 polarization conversion element
54, 55, 56 color separation mirror
57, 58, 59 reflection-type display panel
60 color combining prism
61, 62 mirror
63, 64, 65 PBS
80 light-source unit
81 light source
82 collective lens group
83 polarization conversion element
84 diffusion plate
85 liquid crystal panel
86 heat sink
87 heat radiator
88 housing
90 single plate-type liquid crystal projector

The invention claimed is:

1. A polarization conversion element comprising:
a polarizing beam-splitter array formed to bond a first light-transmitting member with a polarization separation layer that transmits either one of a P wave or a S wave and reflects the other one, and a second light-transmitting member with a reflective layer that reflects the other one of the P wave or the S wave reflected by the polarization split layer, wherein the other one of the P wave or the S wave incident from an incident surface being reflected by the reflective layer to an output surface;
an inorganic half-wave plate which is selectively provided above the output surface of the polarizing beam-splitter array, the inorganic half-wave plate including an obliquely deposited layer made of a dielectric material; and
a protective film that covers side surfaces in a thickness direction of the obliquely deposited layer of the inorganic half-wave plate,
wherein the protective film is selected from a group consisting of $SiO_2$, $Ta_2O_5$, $TiO_2$, $Al_2O_3$, $Nb_2O_5$, LaO, and $MgF_2$,
wherein the obliquely deposited layer is a flat layer,
wherein the inorganic half-wave plate is formed by laminating a glass substrate, a first refractive-index adjustment layer, the obliquely deposited layer, a second refractive-index adjustment laver, and the protective film in this order, and
wherein the protective film covers side surfaces in a thickness direction of the first refractive-index adjustment layer,the obliquely deposited layer, and the second refractive-index adjustment layer.

2. The polarization conversion element according to claim 1 wherein a film thickness of the protective film is equal to or greater than 60 nm.

3. The polarization conversion element according to claim 1, wherein the first light-transmitting member and the second light-transmitting member are bonded via a first adhesive layer made of a silicone-based adhesive.

4. The polarization conversion element according to claim 1, wherein the polarizing beam-splitter array and the inorganic half-wave plate are bonded via a second adhesive layer made of a silicone-based adhesive.

5. The polarization conversion element according to claim 3 or 4, wherein the silicone-based adhesive contains dimethyl silicone or methyl rubber.

6. The polarization conversion element according to claim 1, wherein an antireflective film is formed on an uppermost surface.

7. The polarization conversion element according to claim 1, wherein the first light-transmitting member and the second light-transmitting member are bonded so that the polarizing beam-splitter array is plane symmetric with reference to a vertical plane that passes through a center of the inorganic half-wave plate.

8. A light-source unit, comprising at least:
a light source:
a lens configured to collect light from the light source;
a polarization conversion element according to claim 1 configured to convert the collected light into unidirectional linearly-polarized light; and
a diffusion plate configured to improve a uniformity of the converted light.

9. An optical device comprising a polarization conversion element according to claim 1.

10. A polarization conversion element comprising:
a polarizing beam-splitter array formed to bond a first light-transmitting member with a polarization separation layer that transmits either one of a P wave or a S wave and reflects the other one, and a second light-transmitting member with a reflective layer that reflects the other one of the P wave or the S wave reflected by the polarization split layer, wherein the other one of the P wave or the S wave incident from an incident surface being reflected by the reflective layer to an output surface;
an inorganic half-wave plate which is selectively provided above the output surface of the polarizing beam-splitter array, the inorganic half-wave plate including an obliquely deposited layer made of a dielectric material, and
a protective film that covers side surfaces in a thickness direction of the obliquely deposited layer of the inorganic half-wave plate,
wherein the protective film is selected from a group consisting of $SiO_2$, $Ta_2O_5$, $TiO_2$, $Al_2O_3$, $Nb_2O_5$, LaO, and $MgF_2$,
wherein the obliquely deposited layer is a flat layer,
wherein the inorganic half-wave plate is formed by laminating a glass substrate, a first refractive-index adjustment layer, the obliquely deposited layer, the protective film, and a second refractive-index adjustment layer in this order, and
wherein the protective film covers side surfaces in a thickness direction of the first refractive-index adjustment layer, and the obliquely deposited layer.

11. The polarization conversion element according to claim 10, wherein a film thickness of the protective film is equal to or greater than 60 nm.

12. The polarization conversion element according to claim 10, wherein the first light-transmitting member and the second light-transmitting member are bonded via a first adhesive layer made of a silicone-based adhesive.

13. The polarization conversion element according to claim 10, wherein the polarizing beam-splitter array and the inorganic half-wave plate are bonded via a second adhesive layer made of a silicone-based adhesive.

14. The polarization con version element according to claim 12 or 13, wherein the silicone-based adhesive contains dimethyl silicone or methyl rubber.

15. The polarization conversion element according to claim 10, wherein an antireflective film is formed on an uppermost surface.

16. The polarization conversion element according to claim 10, wherein the first light-transmitting member and the second light-transmitting member arc bonded so that the polarizing beam-splitter array is plane symmetric with reference to a vertical plane that passes through a center of the inorganic half-wave plate.

17. A polarization conversion element comprising:
a polarizing beam-splitter array formed to bond a first light-transmitting member with a polarization separation layer that transmits either one of a P wave or a S wave and reflects the other one, and a second light-transmitting member with a reflective layer that reflects the other one of the P wave or the S wave reflected by the polarization split layer, wherein the other one of the P wave or the S wave incident from an incident surface being reflected by the reflective layer to an output surface;
an inorganic half-wave plate which is selectively provided above the output surface of the polarizing beam-splitter array, the inorganic half-wave plate including an obliquely deposited layer made of a dielectric material; and a protective film that covers side surfaces in a thickness direction of the obliquely deposited layer of the inorganic half-wave plate, wherein the protective film is selected from a group consisting of $SiO_2$, $Ta_2O_5$, $TiO_2$, $Al_2O_3$, $Nb_2O_5$, LaO, and $MgF_2$, wherein the obliquely deposited layer is a flat layer, wherein the inorganic half-wave plate is formed by laminating a glass substrate, a first refractive-index adjustment layer, the obliquely deposited layer, a first protective film, a second refractive-index adjustment layer, and a second protective film in this order, and wherein the first protective film covers side surfaces in a thickness direction of the first refractive-index adjustment layer, and the obliquely deposited layer, and the second protective film covers side surfaces in a thickness direction of the first protective film and the second refractive-index adjustment layer.

18. The polarization conversion element according to claim 17, wherein a film thickness of the protective film is equal to or greater than 60 nm.

19. The polarization conversion element according to claim 17, wherein the first light-transmitting member and the second light-transmitting member are bonded via a first adhesive layer made of a silicone-based adhesive.

20. The polarization conversion element according to claim 17, wherein the polarizing beam-splitter array and the inorganic half-wave plate are bonded via a second adhesive layer made of a silicone-based adhesive.

21. The polarization conversion element according to claim 19 or 20, wherein the silicone-based adhesive contains dimethyl silicone or methyl rubber.

22. The polarization conversion element according to claim 17, wherein an antireflective film is formed on an uppermost surface.

23. The polarization conversion element according to claim 17, wherein the first light-transmitting member and the second light-transmitting member are bonded so that the polarizing beam-splitter array is plane symmetric with reference to a vertical plane that passes through a center of the inorganic half-wave plate.

24. A light-source unit, comprising at least:
a light source:
a lens configured to collect light from the light source;
a polarization conversion element according to claim 10 or 17 configured to convert the collected light into unidirectional linearly-polarized light; and
a diffusion plate configured to improve a uniformity of the converted light.

25. An optical device comprising a polarization conversion element according to claim 10 or 17.

* * * * *